United States Patent

[11] 3,632,175

[72] Inventor Paul Ervin Solt
  Allentown, Pa.
[21] Appl. No. 37,998
[22] Filed May 18, 1970
[45] Patented Jan. 4, 1972
[73] Assignee Fuller Company

[54] PNEUMATIC CONVEYING APPARATUS
  9 Claims, 4 Drawing Figs.
[52] U.S. Cl..................................................... 302/36, 417/401
[51] Int. Cl..................................................... B65g 53/40
[50] Field of Search........................................ 302/17, 36, 55, 49, 41; 417/401

[56] References Cited
UNITED STATES PATENTS
3,423,131 1/1969 Weeks.......................... 302/36
1,489,909 4/1924 Webb............................ 302/36

Primary Examiner—Evon C. Blunk
Assistant Examiner—Hadd S. Lane
Attorneys—Jack L. Prather and Frank H. Thomson ABSTRACT: A pneumatic conveying apparatus which includes a housing having an inlet for material to be conveyed and an outlet. A tubular member is slideably mounted in the housing and serves as a conduit for conveying the material from the inlet to the outlet. A gas pressure operated piston-cylinder arrangement is used to reciprocate the tubular member. As the tubular member reciprocates, a reduced pressure zone is created at the inlet to drawing material into the housing and charge the apparatus. Air exhausted from the piston-cylinder arrangement is used to convey the material. Suitable valving is provided to conduct gas under elevated pressure to opposite sides of the piston to reciprocate the piston and tubular member and direct most of the gas exhausted from the piston-cylinder arrangement to the outlet of the pump to convey the material. Some of the gas exhausted from the piston-cylinder is used to convey the material through the apparatus.

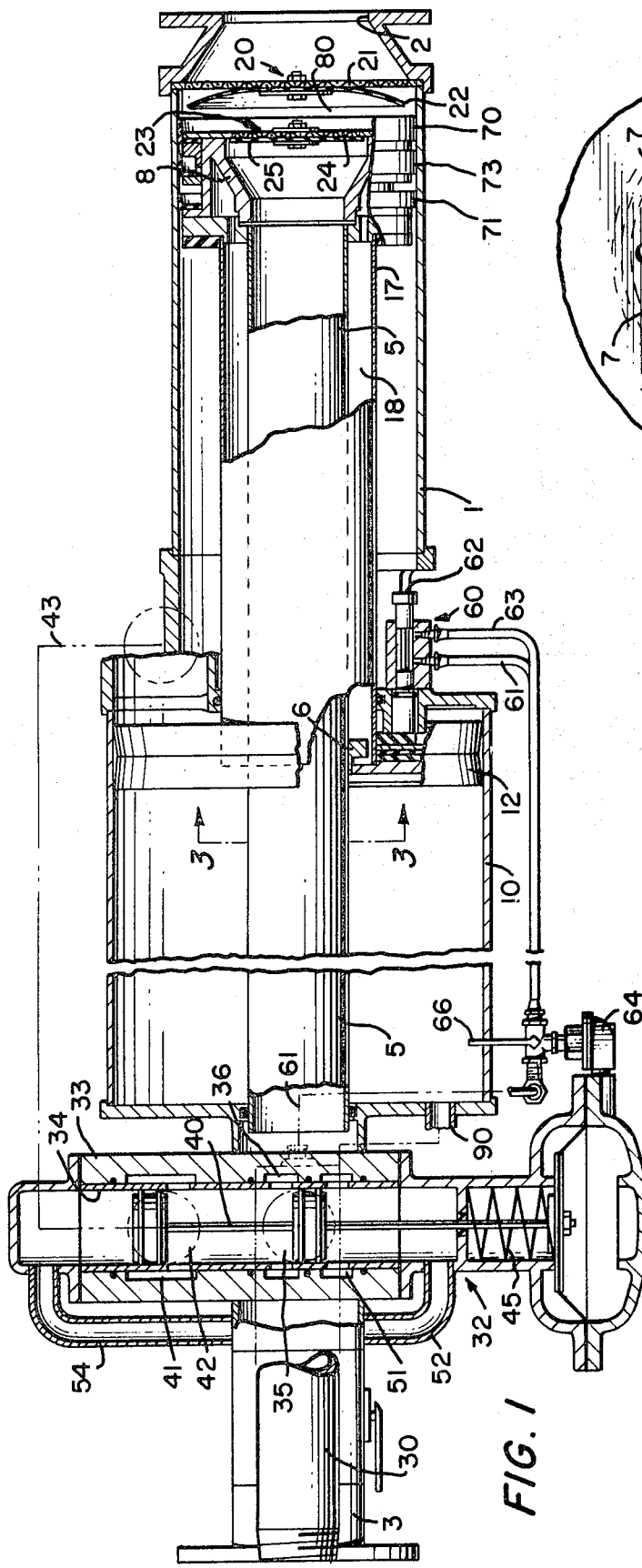
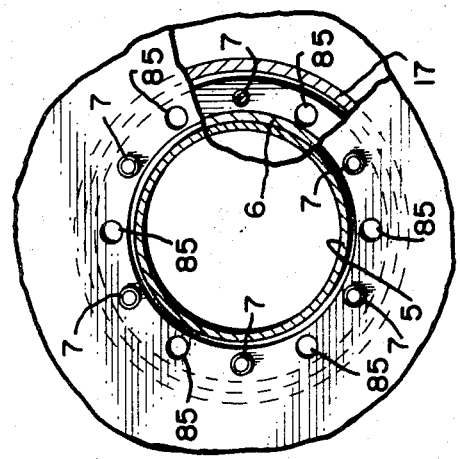
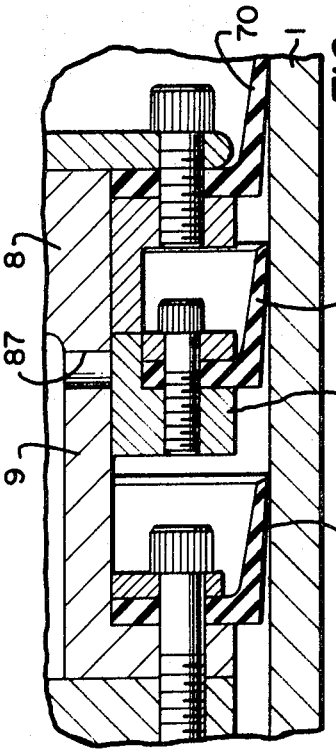
FIG. 1
FIG. 3
FIG. 4
INVENTOR
PAUL ERVIN SOLT
BY
Frank H. Thomson
Jack L. Prather
ATTORNEY

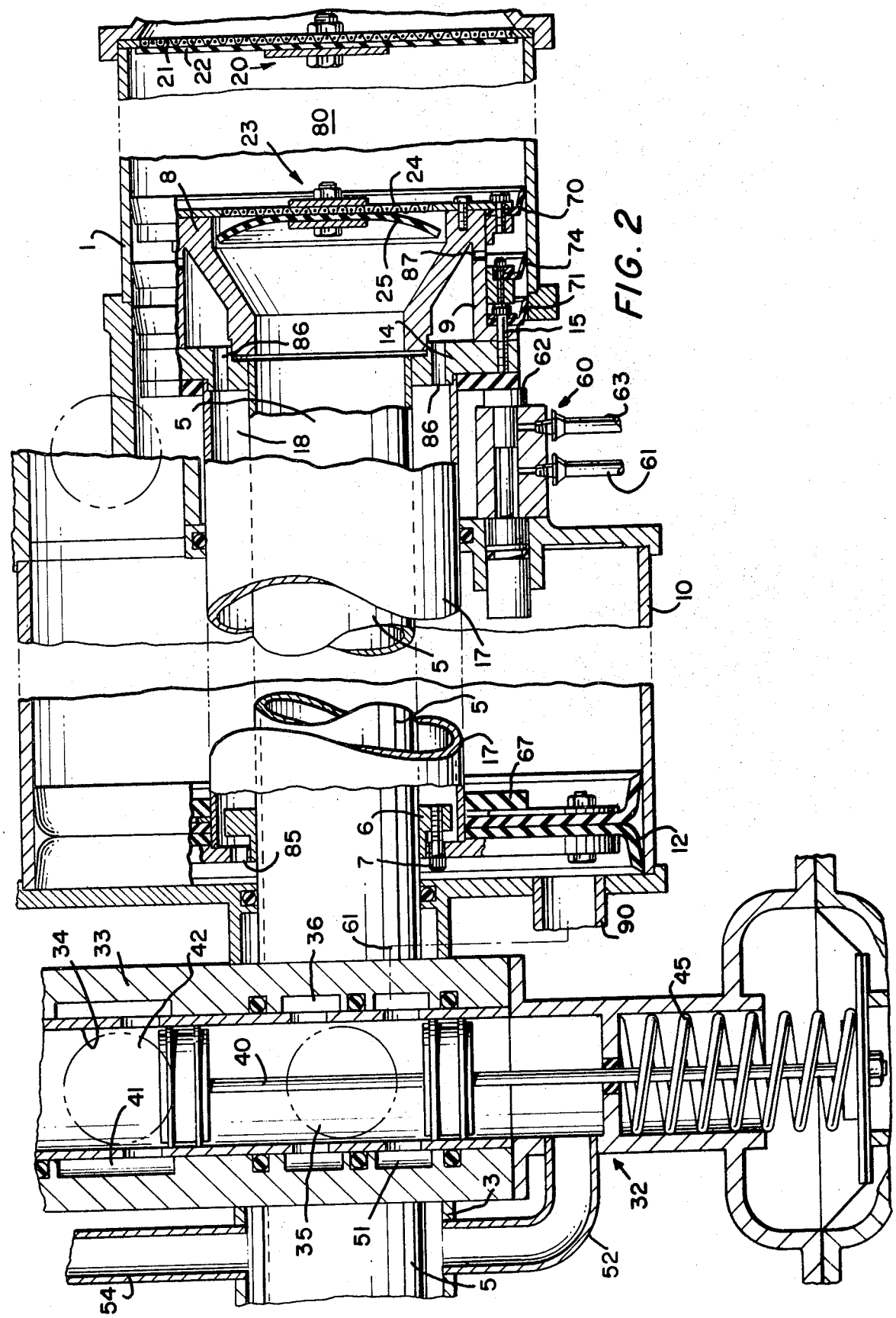

PNEUMATIC CONVEYING APPARATUS

BACKGROUND OF THE INVENTION

This invention relates to pneumatic conveying apparatus and in particular to pneumatic conveying apparatus for use in conveying fluidizable granular material such as cement, grain, flour and the like. The apparatus positively displaces a flowable material from the material inlet into conveying line and pneumatically conveys the material to its destination.

Systems presently in use for conveying granular material include vacuum systems wherein material is drawn through the conveying line and systems wherein material in a compressible state is introduced into the conveying line through a screw conveying feeder. Each of these systems has its advantages and disadvantages. Vacuum systems require special filters for separating the conveyed material from the conveying media. Screw feeders usually require two sources of power, one for operating the screw and one for supplying the conveying media. Both of these systems are expensive to install and are generally considered to be permanent installations.

One solution to the problems presented by prior pneumatic conveying apparatus is shown in U.S. Pat No. 3,423,131 issued to Wyatt J. Weeks. The apparatus disclosed in the aforementioned U.S. Pat. is capable of conveying granular material from a vessel or an open pile of material. It is relatively inexpensive to manufacture and operate when compared to other conveying systems for granular material; it is portable; and the only auxiliary equipment required is a source of gas under pressure. The apparatus of the Weeks patent has the disadvantage that air which operates the device is exhausted to atmosphere. Because air for operating the pump is exhausted to atmosphere, there are excessive pressure losses in the apparatus and the amount of air which is required to operate the apparatus must be substantially larger than that which is necessary for conveying the material. An excess amount of dust and dirt is associated with the operation of the apparatus of the Weeks patent. This is directly related to the exhaust of operating air to atmosphere. The granular material being conveyed often worked its way into the exhaust lines and is discharged to atmosphere.

In U.S. Pat. No. 3,423,131 the air which serves to convey the material is provided by leakage from the operating mechanism of the pump. It has been found that unless a large supply of air at relatively high pressure is used for operating the pump, insufficient air pressure is supplied to convey the granular material.

SUMMARY

It is, heretofore, the principal object of this invention to provide a novel pneumatic conveying apparatus which overcomes the aforementioned disadvantages of prior pneumatic conveying apparatus.

It is another object of this invention to provide a pneumatic conveying apparatus which is relatively inexpensive to manufacture, generally portable and requires little auxiliary equipment for its operation.

It is a further object of this invention to provide a pneumatic conveying apparatus which provides more gas for conveying material in proportion to the amount of gas supplied to the apparatus.

In general, the foregoing and other objects will be carried out by providing a pneumatic conveying apparatus comprising a housing having an inlet for material to be conveyed and an outlet for discharging the material; a tubular member mounted for reciprocal movement within the housing and adapted to convey the material from the inlet to the outlet; fluid pressure operated piston means operatively connected to said tubular member for reciprocating said tubular member and including a piston mounted for reciprocal movement within a cylinder; means for supplying fluid under pressure to said cylinder alternately on opposite sides of said piston for reciprocating said piston; and means for exhausting fluid from said cylinder alternately from opposite sides of said piston nd supplying at least some of the fluid exhausted from both sides of said piston to said housing adjacent said outlet.

BRIEF DESCRIPTION OF THE DRAWINGS

The invention will be described in connection with the annexed drawings wherein:

FIG. 1 is a sectional view of the conveying apparatus of the present invention with the apparatus shown in one operative position;

FIG. 2 is a view similar to FIG. 1 but on an enlarged scale and showing the apparatus in a different operative position;

FIG. 3 is a sectional view taken on the line 3—3 in the direction of the arrows; and FIG. 4 is an enlarged fragmentary view of the portion of FIG. 1.

DESCRIPTION OF THE PREFERRED EMBODIMENT

Referring to the drawings and in particular to FIGS. 1 and 2, there is shown a pneumatic conveying apparatus which includes a housing generally indicated at 1 having a material inlet 2 and a material outlet 3. The inlet 2 is adapted to be connected to a suitable hopper or other source (not shown) of material to be conveyed. The outlet 3 is adapted to be connected to a conveying line (not shown). The housing has an enlarged portion 10 in the approximate center.

A tubular member 5 is mounted for reciprocal movement within the housing 1 and is adapted to convey material from the inlet 2 through the housing to the outlet 3. A piston 12 is mounted for reciprocal movement within the cylinder portion 10 and is secured to the tube 5 by means of a collar 6 and bolts 7 so that as the piston 12 is reciprocated, the tube 5 will also be reciprocated.

An open ended, generally bell-shaped member 8 having a rearwardly extending annular member 9 is secured to the forward or inlet end of the tube 5 by means of an annular collar 14 and bolts 15. A second tubular member 17 surrounds the tubular member 5 along a portion of its length to provide an annular passage 18. The tube 17 is suitably secured to the piston 12 and the bell member 8 so that as the piston and tubular member 5 reciprocate, the tubular member 17 also reciprocates.

A suitable check valve 20 is mounted in the inlet 2 of the housing 1 and includes a perforated disc or screen 21 and a flexible disc 22 mounted on the downstream side of the screen 21. A second check valve 23 is mounted on the bell member 8 adjacent the inlet 2 and includes a perforated disc or screen 24 and a flexible disc 25 mounted on the downstream side of the disc 24. An inlet chamber 80 is defined by the walls of the housing and the two check valves 20 and 23.

In order to reciprocate the piston 12, and hence the tubular members 5 and 17, a suitable air supply and valving arrangement has been provided. An air supply conduit 30 conducts air pressure from a source (not shown) to a suitable valving means generally indicated at 32. The valve 32 includes a housing 33 having a bore 34 therethrough. A spool element 40 is mounted for reciprocal movement in the bore 34. An inlet passage 35 conducts air under pressure from the supply conduit 30 through an annular passage 36 into the interior of the bore 34. In the position shown in FIG. 1, the spool element 40 directs the air under pressure through the bore 34 to an annular passage 41 and an outlet passage 42 to a conduit 43 to the cylinder 10 on the right side of the piston 12. At the same time the portion of the cylinder 10 on the left side of the piston 12 communicates with the valve 32 through a conduit 90 to an annular passage 51 in the housing 33 to the bore 34. The spool element 40 directs the air from bore 34 through conduit 52 to the housing 1 adjacent the outlet 3.

In the position shown in FIG. 2, spool element 40 is shifted so that air is conducted from inlet 35 to annular passage 51 and conduit 90 to the cylinder 10 on the left side of piston 12. The cylinder 10 on the right side of the piston 12 is exhausted through conduit 43 to passage 42, annular passage 41 bore 34 and conduit 54 to the housing 1 adjacent the outlet 3.

Preferably, a conduit (not shown) directly connects the air supply conduit 30 and the outlet 3 so that air under pressure for conveying material or for cleaning the conveying line can bypass the conveying apparatus of the present invention. This conduit may include a valve for regulating the volume of bypass air. Such an arrangement is shown and described in U.S. Pat. No 3,423,131.

The valve 32 is controlled by the position of the tubular member 5. An actuating valve generally indicated at 60 is provided for this purpose. Air under pressure is continuously supplied from the conduit 30 through valve housing 33 to a conduit 61 which supplies air to the valve 60. In the position shown in FIG. 1, a spool element 62 permits the air under pressure to be conducted to a conduit 63 and then to the valve element 32 to move the spool 40 against the biasing force of a spring 45. In the position shown in FIG. 2, a bumper secured to the annular collar 14 contacts the spool element 62 to prevent communication between conduits 61 and 63. A quick exhaust valve 64 on the valve 32 relieves the pressure acting on the spool element 40 and the spool element is moved to the position shown in FIG. 2 by the biasing force of spring 45. The spool element 62 will remain in the position shown in FIG. 2 until it is contacted by a bumper 67 secured to piston 12 which will move the spool 62 to the right and the position shown in FIG. 1 to thereby again provide communication between conduits 61 and 63. The quick exhaust valve 64 may be provided with a hand-operated control lever 66 to permit the valve 32 to be moved to the desired position regardless of the position of the piston 12.

The operation of the apparatus will now be described. It will be assumed that the apparatus is in the position shown in FIG. 1 and just beginning to convey material. When air is supplied from conduit 30, through valve 32 to the cylinder 10 on the right side of piston 12, the air under pressure moves the piston 12 and tube 5 to the left. Annular lip seals 70 and 71 secured to the bell member 8 and lip seal 73 secured to a slideable block 74 engage the inside of housing 1 to prevent communication between the inlet chamber 80 and atmosphere. Thus, as the tube 5 moves to he left as shown in the drawing, a reduced pressure is drawn in at the inlet chamber 80 drawing the disc 22 away from the perforated disc 21 and drawing granular material into the inlet chamber 80. The portion of the cylinder 10 on the left side of the piston 12 is exhausted through passage 90, valve 32 and passage 52 to the outlet 3. When the piston 12 and tube 5 move to the left extreme position, the inlet chamber 80 is fully charged with material.

When the valve 60 is moved to prevent communication between conduits 61 and 63, the valve 32 moves to the position shown in FIG. 2. Air under pressure is now supplied from conduit 30, through valve 32 and conduit 90 to he cylinder 10 on the left side of piston 12 and the piston begins to move to the right. Some pressure will be applied to the material in inlet chamber 80 causing check valve 20 to be closed and opening check valve 23 to permit material to enter the tubular member 5.

It has been found that in order to convey material through the tubular member 5, it is necessary to supply some air under pressure to the chamber 80. In order to supply such air, a plurality of ports 85 have been provided in the piston 12 to permit communication between the cylinder 10 on the left side of the piston 12 and the annular passage 18. The other end of the passage 18 is open through ports 86 in the annular member 14 and ports 87 in annular portion 9 of bell member 8. When the piston 12 and tube 5 move to the right, the sliding block tends to move to the left to permit some of the air under pressure acting on the left side of piston 12 to pass through ports 85, annular passage 18, ports 86 and 87 to lift lip seal 70 off the inside of the housing 1 to communicate with the inlet chamber 80. This air conveys the material in the inlet chamber 80 through the tube 5 to the outlet 3.

The air in the cylinder 10 on the right side of piston 12 is exhausted through conduit 43, valve 32 and conduit 54 to outlet 3 and serves to convey material in the conveying line (not shown).

When the piston and tubular member reach the extreme right position, the valve 60 is moved to provide communication between conduits 61 and 63 to move the valve 32 to the position shown in FIG. 1 and the piston and tube 5 begin to move to the left to recharge the chamber 80. As the tube 5 begins to move to the left, friction causes the sliding block 74 to cover the port 87 to prevent communication between the left side of cylinder 10 and chamber 80. This permits a reduced pressure to be drawn in chamber 80 and the cycle repeats itself.

From the foregoing, it should be apparent that the objects of this invention have been carried out. Because substantially all of the air under pressure which is used to operate the apparatus is conducted from the operating mechanism to the conveying line and not to atmosphere, a more efficient conveying apparatus is provided. There are fewer pressure losses in the apparatus. Dirt is not exhausted to the atmosphere from the system.

It is intended that the foregoing description be merely that of a preferred embodiment and that the invention be limited solely by that which is within the scope of the appended claims.

I claim:

1. Pneumatic conveying apparatus comprising:
   a housing having an inlet for material to be conveyed and an outlet for discharging the material;
   a tubular member mounted for reciprocal movement within said housing and adapted to convey material from the inlet to the outlet;
   fluid pressure operated piston means operatively connected to said tubular member for reciprocating said tubular member and including a piston mounted for reciprocal movement within a cylinder;
   means for supplying fluid under pressure to said cylinder alternately on opposite sides of said piston for reciprocating said piston; and
   means for exhausting fluid from said cylinder alternately from opposite sides of said piston and supplying at least some of the fluid exhausted from both sides of said piston to said housing adjacent said outlet.

2. The conveying apparatus of claim 1 further comprising valve means for controlling the supply of fluid to and the exhausting of fluid from said cylinder.

3. The conveying apparatus of claim 2 further comprising means for supplying at least a portion of the fluid exhausted from one side of said piston to said housing at a point adjacent the inlet when said tubular member moves toward the inlet.

4. The conveying apparatus of claim 3 further comprising means for conducting fluid under pressure to said valve means; first conduit means flow connecting said valve means to said cylinder on one side of said piston and second conduit means flow connecting said valve means to said cylinder on the other side of said piston and means for flow connecting said valve means to said outlet to define said means for supplying fluid under pressure to cylinder and said means for exhausting fluid from said cylinder.

5. The conveying apparatus of claim 4 further comprising means actuated by said tubular member for controlling said valve means to thereby control the flow of fluid to and exhaust of fluid from said cylinder.

6. The conveying apparatus of claim 5 further comprising means for preventing fluid exhausted from said cylinder from being conducted to the housing at a point adjacent the inlet when said tubular member moves away from the inlet.

7. The conveying apparatus of claim 6 further comprising first check valve means mounted in the inlet of said housing and second check valve means mounted in said tubular member adjacent said inlet.

8. The conveying apparatus of claim 4 wherein said cylinder is integral with said housing and said piston surrounds said tubular member.

9. The conveying apparatus of claim 8 further comprising second tubular means surrounding a portion of said tubular member to provide a conduit for conducting fluid from one side of the piston to the housing at a point adjacent the inlet.

* * * * *